United States Patent [19]
Heilig et al.

[11] Patent Number: 5,820,211
[45] Date of Patent: Oct. 13, 1998

[54] HEADREST FOR A VEHICLE SEAT

[75] Inventors: Alexander Heilig, Wissgoldingen; Helmut Maiwald, Schechingen, both of Germany

[73] Assignee: TRW Occupant Restraint Systems GmbH, Alfdorf, Germany

[21] Appl. No.: 901,376

[22] Filed: Jul. 28, 1997

[30] Foreign Application Priority Data

Aug. 16, 1996 [DE] Germany ............... 296 14 238 U

[51] Int. Cl.$^6$ .................................................. B60N 2/42
[52] U.S. Cl. ................... 297/216.12; 297/404; 297/408
[58] Field of Search ................ 297/216.1, 216.12, 297/216.14, 408, 404, 391

[56] References Cited

U.S. PATENT DOCUMENTS

| | | | |
|---|---|---|---|
| 2,636,552 | 4/1953 | Long | 297/216.12 X |
| 2,973,029 | 2/1961 | Schlosstein | 297/216.12 |
| 3,186,763 | 6/1965 | Ferrara | 297/216.12 X |
| 5,181,763 | 1/1993 | Dellanno et al. | 297/404 X |
| 5,290,091 | 3/1994 | Dellanno et al. | 297/216.12 X |
| 5,378,043 | 1/1995 | Viano et al. | 297/216.12 X |

FOREIGN PATENT DOCUMENTS 2152202  11/1980  Germany ................. 297/216.12

*Primary Examiner*—Milton Nelson, Jr.
*Attorney, Agent, or Firm*—Tarolli, Sundheim, Covell, Tummino & Szabo

[57] ABSTRACT

A headrest for a vehicle seat having a backrest comprises a frame securable to the backrest of the vehicle seat, a pad part swivably secured to the frame and a device engaging the pad part which swivels the pad part in the direction of the head of a vehicle occupant in a rear end collision. The device comprise at least one tensioned spring for storing energy. The spring is integrated in the headrest, is relaxed in the case of a rear end collision and results in a swivel movement of the pad part due to the stored energy being liberated.

10 Claims, 1 Drawing Sheet

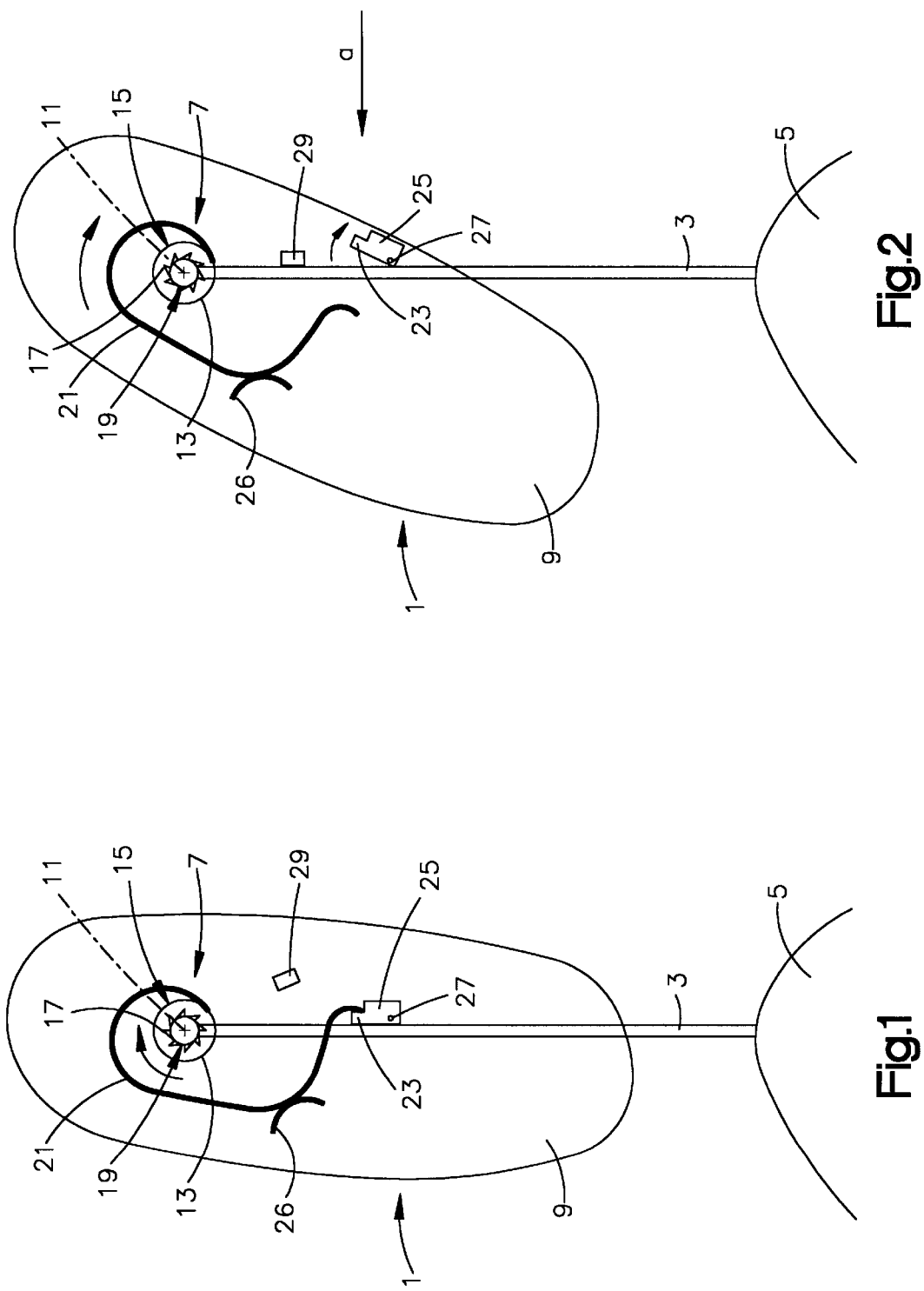

HEADREST FOR A VEHICLE SEAT

FIELD OF THE INVENTION

The invention relates to a headrest for a vehicle seat.

BACKGROUND OF THE INVENTION

The headrest of a vehicle seat has the task of supporting the head of the occupant to the rear in the case of a rear end collision. Since, however, a relatively large spacing normally exists between the headrest and the head of the occupant, in the case of a rear end collision it is the head of the occupant that is first catapulted rearward relative to the vehicle seat until it comes up against the headrest. This results in a shear movement in the region of the nape of the neck which often causes a catapult trauma.

From DE 296 03 991 a vehicle seat having a headrest is known in which a flexible tensioning element is tensioned through the interior of the backrest. This element is bent by the force of the occupant being urged into the backrest in the case of a rear end collision and causes a shift in a securement of the tensioning element relative to the headrest. This results in a swivel movement of the headrest in the direction of the head of the occupant. In the case of the known headrest the means for swivelling the pad part is partly integrated in the backrest.

BRIEF SUMMARY OF THE INVENTION

The invention provides a headrest in which the means for swivelling the pad part is integrated in the headrest itself so that the expense of assembly can be maintained relatively low, as a result of which it is also possible to retain the designs of the backrest known hitherto. This is achieved according to the invention by a headrest which comprises a frame securable to the backrest of the vehicle seat, a pad part swivably secured to the frame and means engaging the pad part which swivels the pad part in the direction of the head of a vehicle occupant in the case of a rear end collision. The means comprise at least one tensioned spring for storing energy. The spring is integrated in the headrest, is relaxed in the case of a rear end collision and results in a swivel movement of the pad part due to the stored energy being liberated. In the case of the headrest in accordance with the invention external energy storages are unnecessary. It is further possible to replace non-active headrests incorporated hitherto by the active headrest in accordance with the invention.

In the preferred embodiment the spring is a bending spring engaging by a first end the frame and, in the tensioned condition, by the opposite second end an actuating sensor configured as an inertial sensor fixedly attached to the frame, this sensor releasing the end assigned in the case of a rear end collision. The bending spring is in contact with the pad part in the vicinity of the second end to couple it into the movement in abrupt relaxation of the bending spring. The actuating sensor is preferably a latching lever swivable due to its mass inertia and the bending spring is bent preferably about the swivel bearing of the pad part.

To prevent an unrestrained swivelling back of the pad part due to the pulse generated by the head impacting the headrest, a locking device is integrated in the headrest in the case of the preferred embodiment which latches the pad part in its forwardmost swivel position.

Furthermore, the means is preferably configured so that, following activation of the headrest by swivel action of the pad part, the spring can be retensioned back into the starting position and the headrest can be latched in the starting position so that it is not necessary after a rear end collision to replace the headrest by a new headrest still to be actuated.

BRIEF DESCRIPTION OF THE DRAWINGS

FIG. 1 is a schematic side view of a preferred embodiment of the headrest in accordance with the invention in a non-actuated condition, and FIG. 2 shows the headrest of FIG. 1 in the actuated condition.

DETAILED DESCRIPTION OF A PREFERRED EMBODIMENT

In FIG. 1 a headrest 1 is shown which comprises a frame 3 having two parallel rods which may be inserted more or less deeply in corresponding receiving fixtures in the backrest 5 of a vehicle seat. A pad part 9 is secured via a swivel bearing 7 to the frame 3. The swivel bearing 7 consists of a fulcrum pin 11 secured to the pad part 9 and, fixedly attached to the frame, a tube 13 surrounding the pin, this tube serving as a bearing bush. In the interior of the tube 13 a locking device in the form of a usual ratchet mechanism 15 is provided. This comprises a ratchet wheel 17 connected to the fulcrum pin 11 and a pawl 19, cooperating with the ratchet wheel 17 and protruding from the inner side of the tube 13.

Secured to the outer side of the tube 13 is a bending spring 21 which is bent elastically in the form of a spiral about the swivel bearing 7, as a result of which it is tensioned. The bending spring 21 engages by its opposing second hook-shaped curved end a nose 23 of an inertial sensor 25. The pad part 9 is in contact with the bending spring 21 by a supporting surface 26 in the vicinity of the second end of the bending spring 21.

The inertial sensor 25 is swivable about an axis 27 rearwardly with respect to the vehicle. The mass of the inertial sensor 25, the location of its axis 27 and the force of the bending spring 21 acting thereon are adapted to each other so that in the case of a rear end collision, illustrated in FIG. 2 by the acceleration vector a, swivelling of the inertial sensor 25 results due to its mass inertia in the direction of the arrow. The headrest 1 is thus activated not before a specific acceleration is attained. Due to swivelling of the inertial sensor 25 in the direction of the arrow the end of the bending spring 21 mounted on the inertial sensor 25 jumps from the nose 23 so that the stored spring energy is instantly liberated, the bending spring 21 urging against the supporting surface 26, swivelling it and the pad part 9 in the direction of the arrow forwards in the direction of the head of the occupant. The bending spring 21 together with the swivel bearing 7, the inertial sensor 25 and the supporting surface 26 is part of a means for swivelling the pad part 9.

A stop 29 in the interior of the pad part 9 limits the swivel movement of the latter forwards. In the forward position the ratchet mechanism 15 prevents the head impinging the pad part 9 from causing a swivelling back of the pad part 9, the pawl 19 thereby mating between adjacent teeth of the ratchet wheel 17.

Due to the spacing between head and headrest 1 being reduced by the active headrest 1, the head impacts with less velocity against the headrest 1 than in the case of a non-active headrest. The pitching movement of the head can be effectively reduced by the active headrest 1.

Following a rear end collision and its activation the headrest 1 need not be replaced by a new headrest, since the bending spring 21 can be retensioned. For this purpose the pawl 19 must first be disengaged from the ratchet wheel 17 and subsequently the pad part 9 swivelled back into its starting position. By urging the pad part 9 past its starting position the hook-shaped curved end of the bending spring 21 can grip the nose 23 and return the inertial sensor 25 into the starting position shown in FIG. 1 in which the inertial sensor 25 is prevented from swivelling back further counter-clockwise by a stop (not shown) acting in one direction only.

We claim:

1. A headrest for a vehicle seat having a backrest, said headrest comprising a frame securable to the backrest of the vehicle seat, a pad part swivably secured to said frame and means engaging said pad part which swivels said pad part in a direction towards a head of a vehicle occupant in a rear end collision, said means comprising at least one tensioned spring for storing energy, said spring being integrated in said headrest and being relaxed in a rear end collision and resulting in a swivel movement of said pad part due to said stored energy being liberated.

2. The headrest as set forth in claim 1, wherein a stop is integrated in said headrest limiting said swivel movement of said pad part forwards.

3. The headrest as set forth in claim 1, wherein said means is configured such that, following activation of said headrest, said spring can be retensioned back into its starting position by a swivel action of said pad part and said headrest can be arrested in said starting position.

4. The headrest as set forth in claim 1, wherein said pad part has a forwardmost swivel position, and wherein a locking device integrated in said headrest is provided which latches said pad part in its forwardmost swivel position.

5. The headrest as set forth in claims 4, wherein said pad part has a swivel bearing around which said spring is bent and wherein said locking device is configured as a ratchet mechanism applied to said swivel bearing.

6. The headrest as set forth in claim 1, wherein said spring having two arrested, opposing first and second ends and wherein an actuating sensor is provided which, in the case of a rear end collision, ensures that one of said opposing ends is released for relaxing said spring.

7. The headrest as set forth in claim 6, wherein said actuating sensor is a latching lever swivable due to its mass inertia.

8. The headrest as set forth in claim 6, wherein said spring is a bending spring which is arrested at said first end to said frame and, in its tensioned condition, engages by its opposing second end said actuating sensor, said sensor being configured as an inertial sensor fixedly attached to said frame and releasing said second end in the case of a rear end collision, and wherein said pad part having a supporting surface in the vicinity of said second end with which said bending spring is in contact.

9. The headrest as set forth in claim 8, wherein said pad part has a swivel bearing around which said-bending spring is bent.

10. The headrest as set forth in claim 9, wherein a bearing bush is provided to which said bending spring is arrested by its first end, and wherein a fulcrum pin is provided which is secured to said pad part and is mounted in said bearing bush.

* * * * *